(12) United States Patent
McGugin et al.

(10) Patent No.: US 6,240,783 B1
(45) Date of Patent: Jun. 5, 2001

(54) BRIDGE MONITORING SYSTEM

(75) Inventors: Terry Curtis McGugin, Madison; George Ashley Wiggs, Huntsville, both of AL (US); Stephen Keith Bishop, Ardmore, TN (US)

(73) Assignee: USBI, Co, Huntsville, AL (US)

( * ) Notice: Subject to any disclaimer, the term of this patent is extended or adjusted under 35 U.S.C. 154(b) by 0 days.

(21) Appl. No.: 09/071,993

(22) Filed: May 2, 1998

(51) Int. Cl.[7] ............................. G01M 7/00; G01H 9/00
(52) U.S. Cl. ............................................ 73/594; 73/579
(58) Field of Search .............................. 73/594, 579, 580, 73/655, 656, 657; 340/540, 669, 670, 683; 250/559.3, 559.32

(56) References Cited

U.S. PATENT DOCUMENTS

| | | | |
|---|---|---|---|
| 3,952,583 | * | 4/1976 | Rosati ..................................... 73/655 |
| 4,526,465 | * | 7/1985 | Corti et al. ............................. 73/657 |
| 4,549,437 | * | 10/1985 | Weins et al. ........................... 73/587 |
| 4,723,448 | * | 2/1988 | Veligdan ................................ 73/657 |
| 4,823,601 | * | 4/1989 | Barna ..................................... 73/657 |
| 4,843,372 | * | 6/1989 | Savino ................................... 73/786 |
| 4,850,225 | * | 7/1989 | Chen et al. ............................ 73/572 |
| 4,889,997 | * | 12/1989 | Tomiolo ................................ 250/561 |
| 4,901,575 | * | 2/1990 | Bobannan et al. .................... 73/587 |
| 5,026,141 | * | 6/1991 | Griffiths .......................... 250/227.14 |
| 5,255,565 | * | 10/1993 | Judd et al. ............................. 73/579 |
| 5,404,132 | * | 4/1995 | Canty et al. .......................... 340/686 |
| 5,520,052 | * | 5/1996 | Pechersky .............................. 73/579 |

OTHER PUBLICATIONS

"Technical Proposal for Global Bridge Evaluation and Monitoring"; Wiggs et al.; Jun. 6, 1994; pp. I–i to I–30.*

* cited by examiner

Primary Examiner—Helen Kwok
(74) Attorney, Agent, or Firm—Norman Friedland (57) ABSTRACT

A bridge monitoring system uses laser light reflected from structural members of a bridge to create velocity and displacement time signals of the bridge's vibratory response to quiescent conditions, and converts the sensed velocity and displacement time data to frequency domain data to provide a "signature" waveform for the bridge indicative of its structural characteristics.

26 Claims, 8 Drawing Sheets

BRIDGE MONITORING SYSTEM

TECHNICAL FIELD

This invention relates to monitoring systems, and more particularly to systems which monitor the structural integrity of bridges.

BACKGROUND ART

As known, bridges provide a structural pathway over depressions or obstacles to facilitate pedestrian and or vehicular and or railway travel over the obstacle. By far the bridges with the highest to frequency of use are the roadway bridges of the interstate and state highway systems, which have tens of thousands of vehicles crossing them each day. They are a critical part of the country's transportation infrastructure, and structural failure of a bridge creates a serious public safety risk as well as disruption of commerce.

State and Federal Departments of Transportation regulations require bridge safety inspections. These inspections have principally involved visual inspection of the bridge structure for signs of deterioration, such as corrosion, erosion, and signs of stress fatigue. However, the increased number of catastrophic bridge failures in the recent decade has prompted many state DOTs to begin conducting dynamic load testing of bridges to better evaluate their structural integrity.

The State of Alabama, for one, performs load tests on bridges which have been designated "load limited" due to actual traffic volume being larger than the theoretically allowable volume for the particular bridge or the bridge design. This testing program consists of instrumenting the bridge structure with strain gauges and/or linear variable displacement transformers, which are connected to a data acquisition system. Known static and dynamic loads are applied to the bridge using weighted DOT trucks which perform a sequence of maneuvers simulating actual traffic loads. The measured stresses (e.g. flexure of key structural members) are compared to the bridge's de sign values and a determination of structural integrity is made. If the bridge is unsafe it is closed, but in most instances the actual stress are far below design criteria due to conservative design calculations and the fact that materials used in the construction of the bridge often exceed specification. If, however, the bridge conditions change, such as an increase in traffic frequency, a higher proportion of heavy load vehicles, or more sever environmental changes, the operational life expectancy of the bridge changes accordingly.

Present methods of measuring bridge load capacity require extensive contact sensor or gage placement, long wire/cable routing, scaffolding, or cherry picker use to gain accessibility. These are labor intensive tasks which require special safety precautions to prevent worker injury. As a result these inspections can only be performed periodically. However, post analysis of structural failures indicates that bridges deteriorate in an unpredictable manner. In some cases structural deterioration may go unnoticed despite load tests due in part to the limited dynamics which may be observed with the staged loads. New methods and equipment are required to quantitatively measure the overall use (or real time) conditions of a bridge, and to correlate measured data to the bridge's condition of deterioration or change in load capacity with time.

DISCLOSURE OF INVENTION

One object of the present invention is to provide a bridge monitoring system for performing in situ monitoring of real time load dynamics of a bridge structure to quantify acceptable structural integrity characteristics which may be compared over time with actual bridge loads to determine structural degradation and thereby alert repair. Another object of the present invention is to provide a bridge monitoring system capable of providing non-contact measurement of structural loading of a bridge According to the present invention a bridge monitoring system uses laser light reflected from structural members of a bridge being monitored to create velocity and displacement time signals of the bridge's vibratory response to quiescent conditions, and converts the sensed velocity time data to frequency domain data to provide a "signature" waveform for the bridge indicative of acceptable structural integrity characteristics of the bridge. In further accord with the present invention the bridge monitoring system obtains the velocity and displacement time signals without the need for sensor contact mounting with the bridge structure.

In still further accord with the present invention, the bridge monitoring system includes a site installed motion monitoring system for obtaining velocity time signal data of an on site bridge structure and for reporting the sensed data to a remote central analysis center which is responsive to sensed data from a plurality of site installed motion monitoring systems, thereby creating a centralized time history for a plurality of bridges in a jurisdiction.

The present invention provides a comprehensive bridge management system using noncontact techniques in obtaining real time data on the condition of a bridge, such as to allow the impacts and repercussions of bridge deterioration or failure to be dealt with in the most efficient, safe and cost effective manner.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
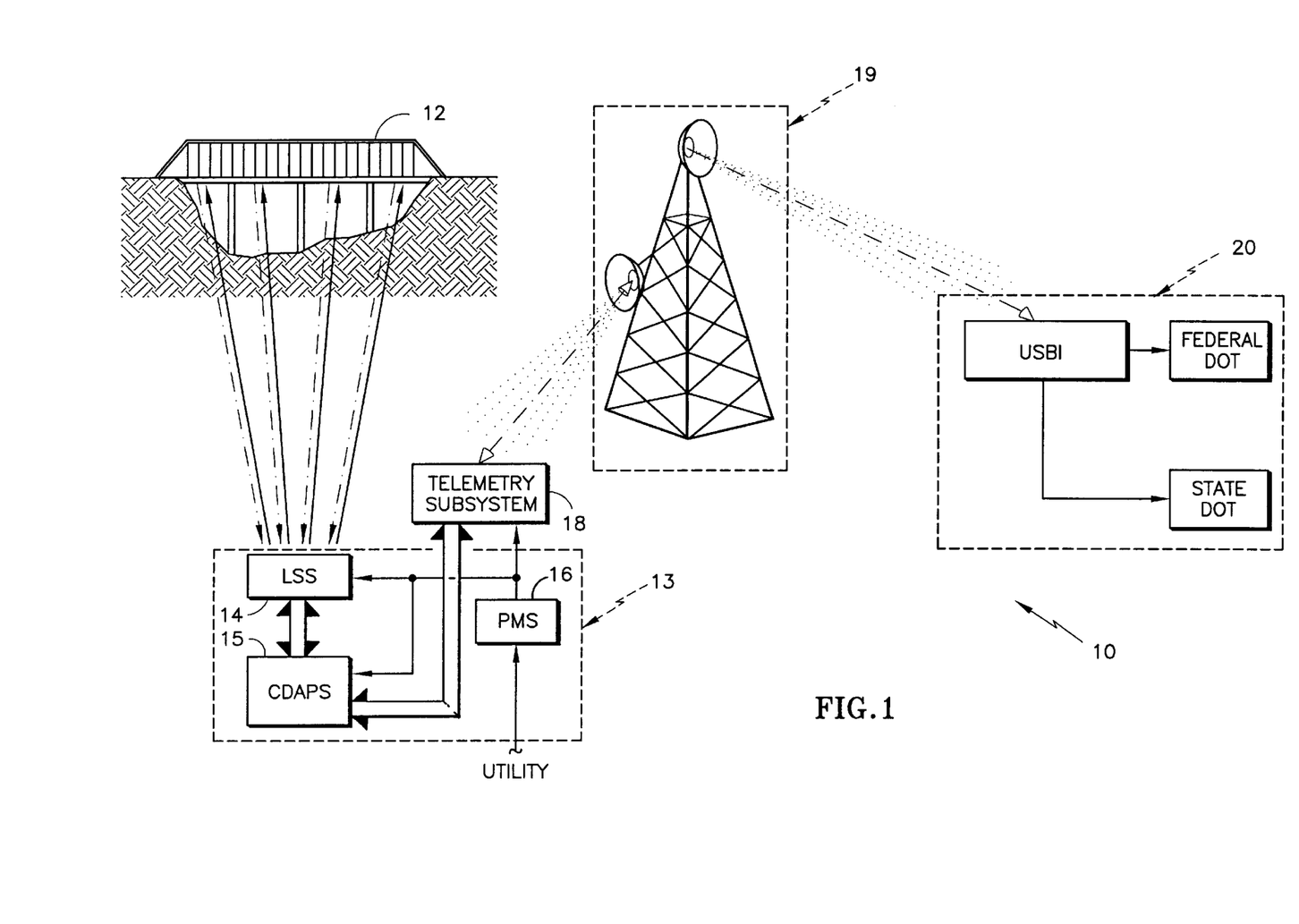
FIG. 1 is a figurative illustration of the Bridge Monitoring System of the present invention.

Referring to FIG. 1, in a figurative illustration of the present Bridge Monitoring System (BMS) 10 for monitoring the structural integrity of a bridge 12, the BMS 10 comprises a site installed Motion Measurement System (MMS) 13, which itself includes: a Laser Sensing Subsystem (LSS) 14 for sensing vibratory responses from the bridge 12, a Control, Data Acquisition and Processing Subsystem (CDAPS) 15 for providing control and processing of data from the LSS 14, and a Power Management Subsystem (PMS) 16 which provides electrical power to both subsystems. The BMS further includes a site located Telemetry Subsystem 18, which may also receive electrical power from the PMS 16, and a remotely located Analysis and Reporting Subsystem (ARS) 20. The MMS 13 communicates with the ARS 20 through the telemetry subsystem 18 and a commercially available transmission network 19.

As described in detail hereinafter, the LSS 14 detects the vibrational characteristics, or "signature" of the bridge by performing non-contact sensing of the velocity and displacement of selected surface points on the bridge by using laser interferometry. The bridge's signature is unique to its collection of structural members, each of which have different shapes and possibly comprise different materials. By measuring the vibrations at carefully chosen structural points it is possible to characterize the signature of the bridge resulting from specific stimuli (traffic flow, environment, etc.).

Figure 2:
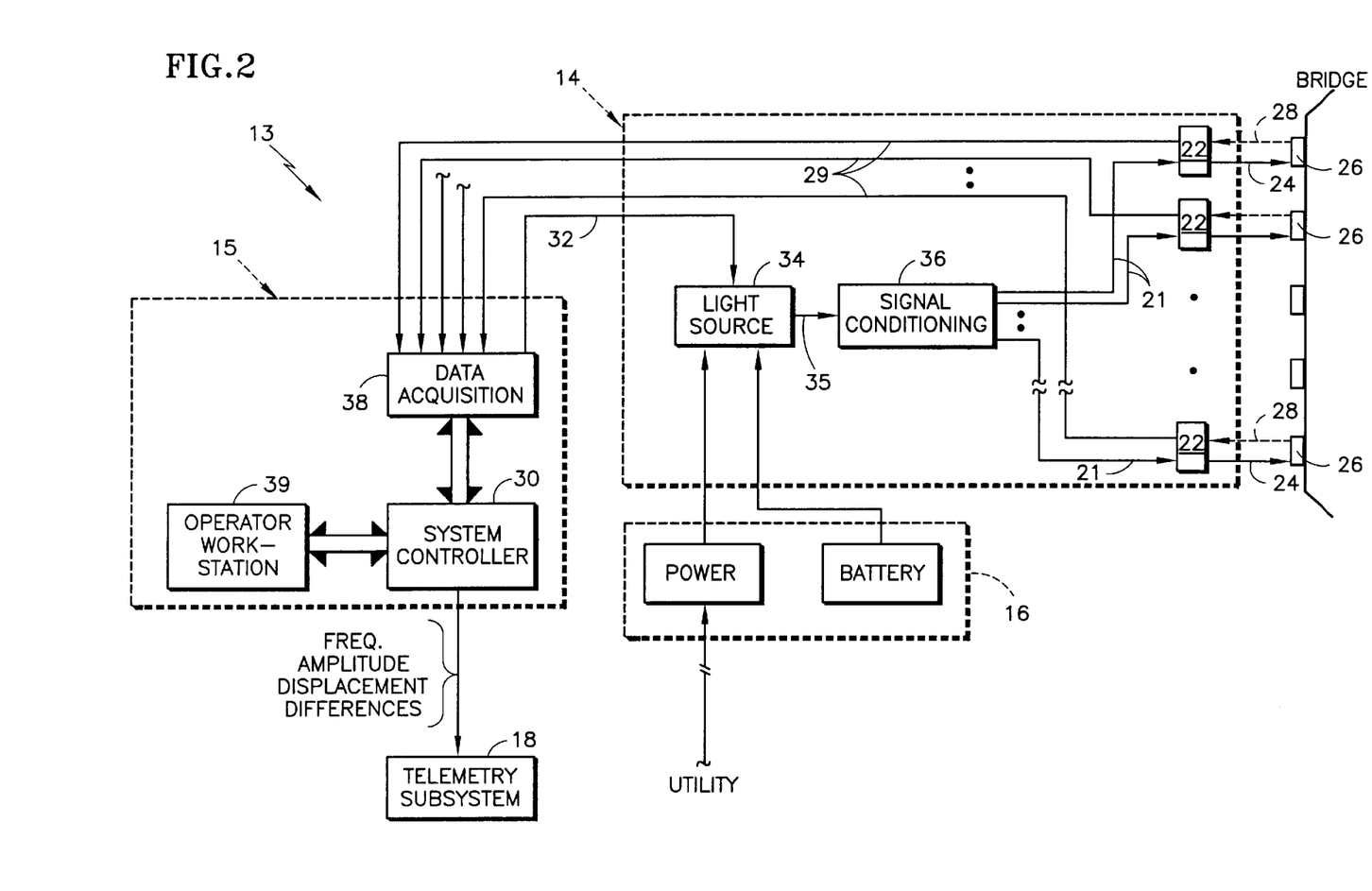
FIG. 2 is a block diagram illustration of certain ones of the system elements shown in FIG. 2.

FIG. 2 is a simplified functional block diagram of the site installed MMS 13 and telemetry subsystem 18. The LSS 14 includes one or more laser sensors 22 (described hereinafter with respect to FIG. 3), each providing a transmitted light beam 24 to a related one or more reflective targets 26 located on structural members of the bridge 12. Depending on the composition or state of the targeted structural member, the targets 26 may comprise retro-reflective tape, such as that manufactured and sold by the 3M Company or, if necessary, corner cube retro-reflectors. Each sensor 22 receives the reflected light beam 28 returned from the target. The sensors detect the velocity-time data in each reflected beam 28, which is embodied in electrical data signals that are provided through lines 29 to the CDAPS 15.

The CDAPS performs pre-processing of the data, as described in detail hereinafter, and periodically, or on command from the ARS 20, transmits the pre-processed data through the telemetry subsystem 18 to the ARS. The CDAPS 15 includes a system controller 30 which, through control signals presented to the LSS 14 on lines 32, governs operation of the laser sensors 22, including the LSS lights source 34 and signal conditioning circuitry 36. The system controller also controls the presentation of the acquired velocity-time data signals on lines 29 to a CDAPS data acquisition unit 38 and operator workstation 39. The data acquisition unit 38 converts the velocity-time data to the frequency domain and compares the frequency data to historical vibrational data for the same bridge, to detect anomalies in the vibratory response. Finally, a decision analysis function is performed to determines the proper course of action based on data analysis results.

Each laser sensor 22 is camera size, and may be individually or gang mounted on a tripod support base or in a permanently placed housing. The CDAPS system controller 30 controls the laser sensors 22, and uses a series of selectable detectors to provide velocity and displacement output from the interferometer's signal. The CDAPS 15 is housed in a rack-mountable enclosure and through the system controller 30 performs data processing and signal analysis of the velocity and displacement data received from the sensors.

The LSS uses laser interferometry, or Doppler effect, to sense the vibratory motion of the bridge. The Doppler effect is the shift in the frequency ($\Delta f$) of the reflected laser beam radiation 28 from the target 26 on the bridge member. A first order mathematical expression for the Doppler shift in frequency of a beam of light emitted at a frequency $f_1$, is:

$$\Delta f = f_1 * v/c \qquad \text{Equation 1}$$

where v is the velocity of the structural member, relative to an observer, in the direction of the laser light beam 24, and c is the speed of light.

Assuming sinusoidal vibration of the member in the x direction, at a frequency $f_b$, the motion of the surface point in the x direction may be expressed as:

$$x = x_0 + \Delta x \sin(2\pi f_b t) \qquad \text{Equation 2}$$

where $\Delta x$ is the amplitude of the vibration and t is time. The velocity (v) of this point is the time derivative ($d_x/dt$) of x (Eq. 2), or:

$$v = d_x/dt = 2\pi \Delta x f_b \cos(2\pi f_b t). \qquad \text{Equation 3}$$

If the laser light beam 24 is incident on the surface point along the x direction, the returned light 28 is Doppler shifted $\Delta f(t)$ in response to the instantaneous velocity v (Eq. 3) of the surface, such that:

$$\Delta f(t) = [4\pi \Delta x f_1 f_b \cos(2\pi f_b t)]/c \qquad \text{Equation 4}$$

If the light wavelength $\lambda_1$, is substituted for frequency ($\lambda_1 = c/f_1$), the Doppler shift can be expressed as:

$$\Delta f(t) = [4\pi x f_b \cos(2\pi f_b t)]/\lambda_1. \qquad \text{Equation 5}$$

The Doppler shift from the vibrating surface point produces frequency modulation (FM) of the returned light beam. The maximum excursion in frequency in one direction (increase or decrease), $\Delta f_{max}$, is:

$$\Delta f_{max} = [\Delta f(t)] = 4\pi \Delta x f_b / \lambda_1. \qquad \text{Equation 6}$$

The standard method of measuring distance with a laser (time of flight) is to direct a short pulse of laser light to the point to be measured and determine the travel time of the light reflected back to the optical detector. In this instance the distance resolution is limited by the laser pulse width. However, in monitoring the vibration signature of a bridge there is no need to know the distance to the target but only the change in surface point position over some period of time. In this case a continuous wave (CW) laser can be used.

The change of surface point position, or the displacement of the bridge, may be either derived from velocity time history of the bridge as returned by the reflected laser signal or determined by the output of a detector known as a fringe counter. The LSS uses a fringe counter. A fringe counter measures the number of fractional wavelengths which a surface moves. A basic fringe counter has a resolution of $\gamma/2$ or one half the characteristic of the CW laser. Each half wavelength of surface motion is counted. The output of the counter is passed through a D/A (digital to analog) converter and presented as an analog voltage output that is relative to the displacement of the surface of the bridge.

If the Doppler signal is passed through a frequency discriminator the surface point vibrational frequency and the deflection amplitude can be determined. The Doppler frequency shift is small compared to the frequency of light. For example, if laser light at a 1.5 $\mu$m wavelength (frequency of $2 \times 10^{14}$ Hz) is used to sense bridge surface motion having a frequency of 6 Hz and a deflection amplitude of 1.25 cm (0.5 inches), the maximum Doppler shift is $6.2 \times 10^5$ Hz, or a change in frequency of 3 parts in $10^8$. This small shift can be measured by the laser sensors 22 using optical homodyne detection.

Figure 3:
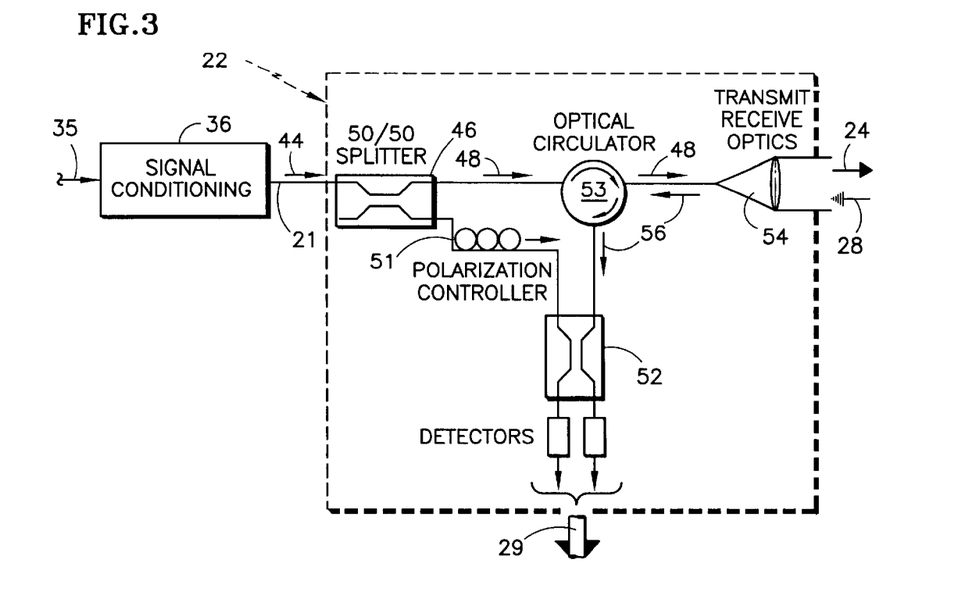
FIG. 3 is a schematic diagram of one element shown in the block diagram illustration of FIG. 2.

Optical homodyne detection is analogous to the RF heterodyne technique used in all modern radio receivers. FIG. 3 is a schematic of the laser sensor 22 in an optical homodyne detection embodiment. The sensor 22 receives, on lines 21 from signal conditioning circuitry 36, a laser light beam 44 at the input of a beam splitter 46, which splits the beam into an output signal 48 and a local oscillator, or reference, signal 50. The local oscillator signal 50 is presented through polarization controller 51 to optical detector 52. The output signal 48 is routed through an optical circulator 53 and output optics 54, and is presented to the target surface as the sensor laser signal beam 24 (FIG. 2). The target reflected laser beam 28 (FIG. 2) is received by optics 54 and presented as a data signal 56 through the circulator 53 to the detector 52 to be combined with the local oscillator signal 50. The output of detector 52, which is presented on lines 29 (FIG. 2) to the CDAPS 15, will have a component that represents the difference in frequency between the laser signal reference beam 50 and the reflected laser signal 28. Any frequency shift caused by the Doppler effect will appear at the detector output.

In the Doppler-sensing mode for vibration measurement, the electrical output signal detector in the single-channel assembly contains only low frequencies. The output will be amplified and conditioned to remove frequency components outside the range of interest. The range of frequencies is determined by the vibration frequencies and amplitudes of the bridge. On the low end, a 0.001 inch ($2.54 \times 10^{-3}$ cm) movement at 6 Hz produces a peak Doppler shift of 1.2 KHz, while motions on the order of 0.5 inch (1.27 cm) at 6 Hz generate a peak shift of 600 KHz. Since the interest is only in the frequency of the electrical signal, automatic gain control can be employed in the conditioning amplifier to present a near constant-amplitude signal to the signal-processing electronics.

The laser light source selected for the system must be capable of producing a stable, single frequency, light beam. However, all lasers experience frequency shift over longer periods of time (seconds or longer) and over shorter intervals the laser frequency ($f_1$) may exhibit frequency jitter. To this extent the laser light can be viewed as being frequency modulated by a random signal. Since $f_1$ is subtracted from the reflected signal 28, drift or jitter might not be a concern, except that the returned signal is delayed in time from the local oscillator signal. If $f_1$ changes over this delay interval then the output of detector 52 will represent not only the Doppler shift in the returned signal but also the difference in frequency between the local oscillator and the returned signal. Therefore, frequency jitter must be made small compared to the Doppler shift over the target round-trip time.

As an example, if the laser is illuminating a bridge member from a distance of 30 meters the light signal round trip time is 0.3 μs (0.3 microseconds), while at a 1 Km distance the time is 6.7 μs. This means that frequency jitter must be below 100 kHz. Diode lasers have jitter rates that extend into the GHz region, while solid state crystal, or glass lasers, have jitter rates in the acoustic region; typically below 1.0 Khz. The laser frequency for these solid state crystal and glass lasers is, therefore, stable over the round trip time of interest for the present BMS.

Other considerations governing selection of the type laser include: eye safety, invisibility of the laser beam (to avoid attracting attention), single-frequency, long operating lifetime, and low power consumption. Photonics components used for the 1.55 μm wavelength communication region satisfy all of these requirements. The modulation formats needed for wide-bandwidth communications have led to the development of stable 1.55 μm single frequency lasers, both semiconductor and solid state. Known Erbium (Er)-doped optic fibers can be used to make single-frequency lasers of exceptional short term frequency stability, and can also be used as amplifiers to increase the output power of a source, thereby allowing one source to be used to illuminate multiple sensing points.

Another advantage of using a 1.55 μm is that fiber-optic components can be used to perform functions other than simply supplying the laser source. Fiber-optic splitters can be used to extract some of the laser power for use as the local oscillator in homodyne detection for Doppler measurements. The same type of splitter can be used to combine the returned optical signal and the local oscillator into one beam incident on the photodetector. Fiber-optic amplitude modulators are available for modulation frequencies in the range from DC to 10 GHz. The semiconductor devices are engineered to be reliable for the fiber communications applications, including submarine cables and have operating lifetimes in excess of 20,000 hours. All the fiber components can be coupled together by standard fiber technology to build a compact and rugged system, which only has to interface at one point, to the external bulk optics used to send and receive the beam.

Figure 4:
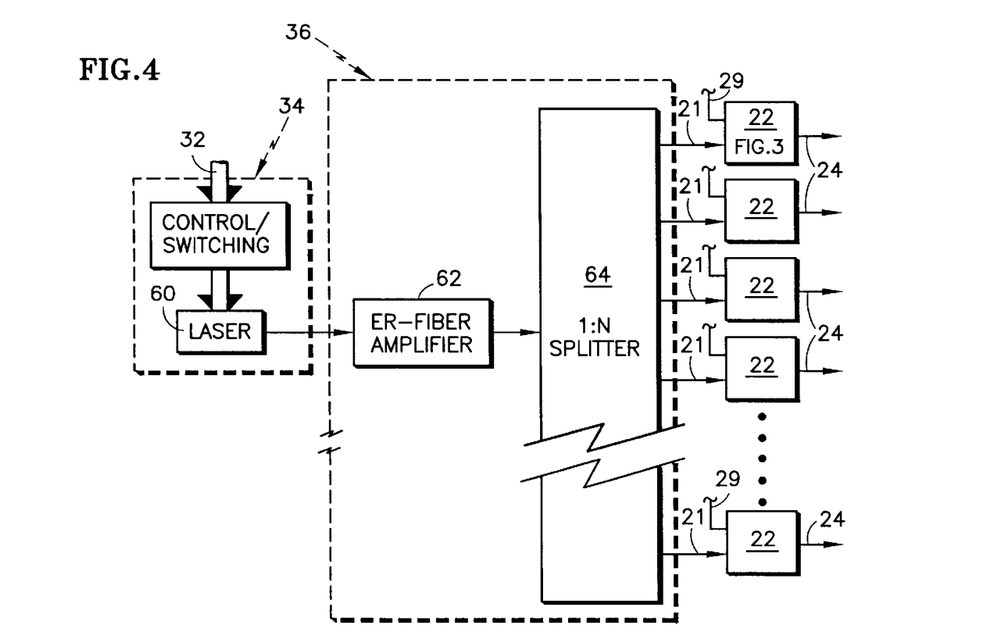
FIG. 4 is a block diagram illustration of another system element shown in FIG. 1.

FIG. 4 is a more detailed schematic of the LSS 14 of FIG. 2, no as a multiple-point laser sensor designed for monitoring the vibratory response of a plurality of structural members of a bridge. The light source 34 includes an Er doped solid state CW laser 60, which is controlled by control switching circuitry 61 in response to control signals from the system controller 30 (FIG. 2) on lines 32. The CW laser generates 15 mW of single frequency output at 1.55 μm and has a jitter line width of <20 Khz. The laser output is provided on line 35 to the signal conditioning circuitry 36. The signal conditioning circuitry includes an Er-doped fiber amplifier 62 boosts the 15 mW power level of the laser source and presents the amplified laser light to a 1:N splitter 64. The Er doped amplifier can be run at power levels as high as 500 mW, thereby allowing for as many as thirty single-channel laser sensors of the type shown in FIG. 3. The power out-put of this multi-point laser sensor is sufficient for sensing vibration at laser source to bridge distances of several hundred feet.

As known to those skilled in the art, there are several available software and hardware tools that may be used by the CDAPS system controller 30 to process the velocity-time data signals on lines 29 (FIG. 2). As an example, MATLAB® software by The Mathworks®, is available on both the UNIX workstation (at the ARS 20) and the PC workstation 39 used in the CDAPS 15. The signal processing toolbox for MATLAB is also available on both of these platforms. The data acquisition software that is used is LabVIEW® by National Instruments®. LabVIEW is a software application used for data acquisition, analysis, signal processing and instrument control. Compatible versions of LabVIEW are available on both the portable PC controller and a laboratory Macintosh based system. The Macintosh version of LabVIEW is the full development version which has the advanced analysis module and can be used to process acquired signals near real time. Using the Macintosh version of LabVIEW and the Macintosh data acquisition system, up to thirty-two (32) simultaneous channels can be acquired at a maximum scan rate of 47,000 samples per second. The portable PC based data acquisition system can acquire up to sixteen (16) simultaneous channels at a maximum scan rate of 100,000 samples per second using a DAQ Card™ 700, PCMCIA card. Available signal processing hardware tools include a HP 3566A/3567A PC signal analyzer that can also be utilized to post process data measured with the LSS or other conventional transducers.

The data analysis may be performed on-the-fly, as data is acquired from the laser sensor, or may be performed off-line after data processing has stored the data, depending upon data rate and complexity of analysis performed. The LSS is portable and may be placed into operation at any desired test site. Current limitations of the port-ability of the system are the requirement for generated line power for the laser controller and the operating conditions desired by the LSS equipment. The power generator and power conditioning units in use for the LSS are the heaviest components to transport/setup. The LSS equipment is currently designed primarily for office or laboratory conditions and some care must be taken when operating under field conditions.

The maximum distance between the BMS site and the bridge being monitored (i.e. the "standoff") is on the order of 1000 meters, however, depending on the bridge geometry and surrounding landscape, standoff may be as low as tens of meters, with typical standoff being in the range of hundreds of meters. The extremes of the standoff range are governed on the higher end of range by laser output power and the accuracy of the laser boresight to the target surface, and are limited by field of view considerations on the lower end of range. The preferred laser would operate at or around a wavelength of 1.55 $\mu$m.

The Power Management Subsystem 16 provides electrical power to the LSS 14, the CDAPS 15, and the telemetry subsystem 18. For fixed MMS installations, the PMS 16 will receive utility power, and will provide surge protection and emergency back-up power for the MMS in the event of utility outage. In the event of a temporary installation, or for field testing, the PMS may use a generator to power the MMS and telemetry subsystems. In some cases, continual data acquisition for the bridge will be desirable, while in other cases triggering of the data acquisition system will be done through programming based on an excessive load or spectrum departure. In either case, the power management system will determine the level of power required by the control, data acquisition, and processing subsystem.

The CDAPS will perform five basic functions: sensor control, data acquisition, data preprocessing, temporary data storage and health monitoring. The sensor control functions of the CDAPS will be the controlling interface to the laser sensing subsystem. This function will control the targeting of the laser, the potential thresholds of an external trigger or the initiation of a sample. The data acquisition function is responsible for the automatic acquisition of data from the laser sensing subsystem.

Data is collected continuously. Raw data collected by the LSS will preprocessed before storage and will represent a time slice of the structure's velocity. Site display of the data can be done via the workstation 39 (FIG. 2), or the data may be disc stored and transferred to the ARS 20 for analysis. The system controller 30 within the CDAPS 15 also performs a health monitoring routine, using built-in test circuitry to detect for MMS failures or out of calibration conditions. The routine enables the controller to check parameters, such as voltage, current, and temperatures, and the operational status of the laser system. These test results will be stored with the sensor data for later processing and/or transmission to the ARS 20. If a critical failure or out of tolerance condition is detected, a message will be initiated to alert personnel at the ARS.

Figure 5:
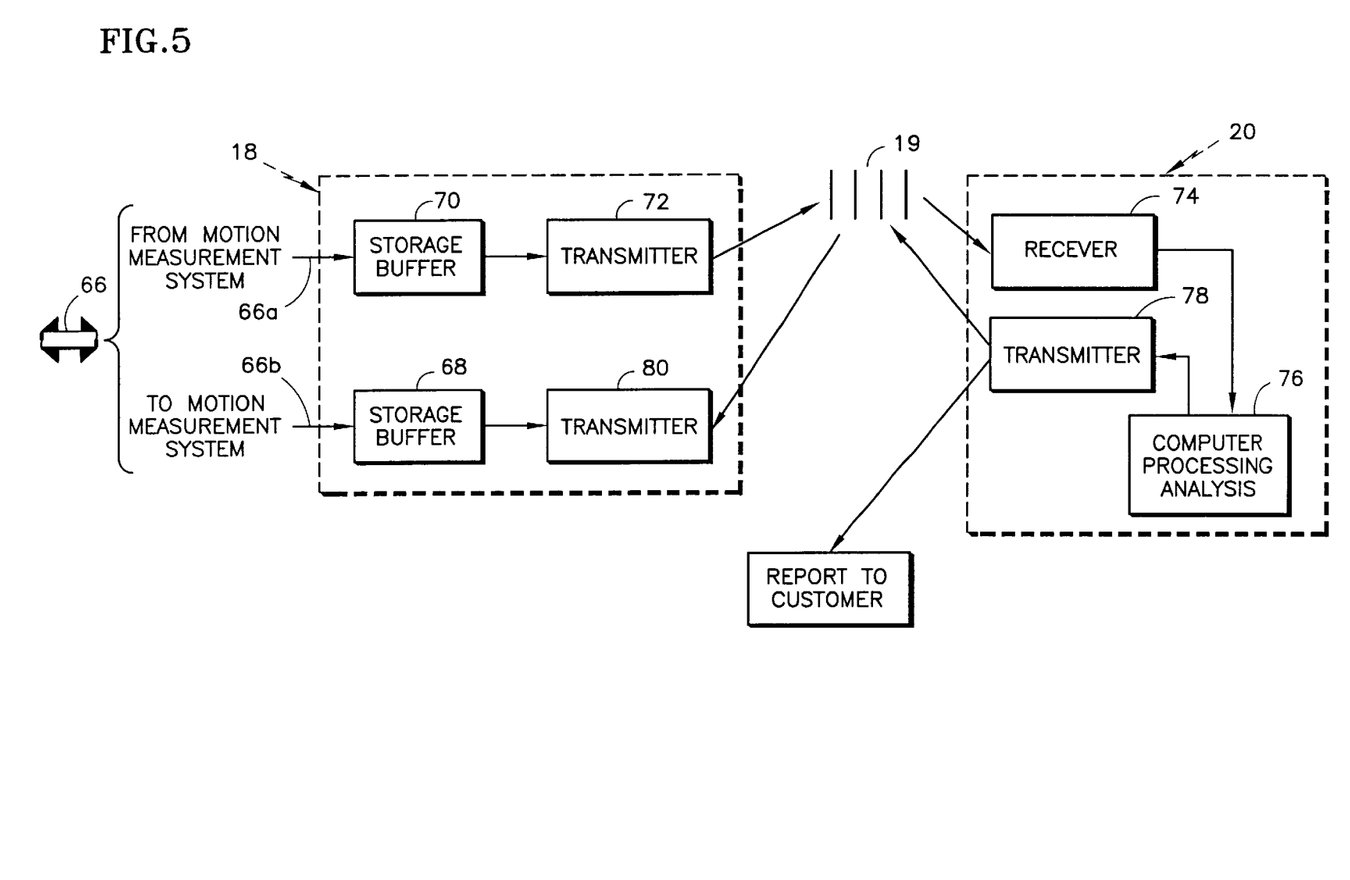
FIG. 5 is another block diagram illustration of still another system element shown in FIG. 1.

FIG. 5 is a simplified block diagram of the telemetry subsystem 18 interface with the ARS 20 via the telemetry network 19. The telemetry subsystem exchanges information with the CDAPS 15 of the MMS 13 through lines 66, including a telemetry receive line 66a and a transmit line 66b. The communication lines are buffered with registers 68, 70. The register 70 forwards the received NMS information to a transmitter 72, which may be a microwave transmitter, or other suitable electronic transmission link. The transmitted data is received by the ARS through the network 19, at a receiver 74, which forwards the data to a central computer 76. Command information (requests for data, etc.) from the computer are forwarded through an ARS transmitter 78 and the network 19, to the telemetry receiver 80, which forwards the command information through storage buffer 68 to the MMS.

To ensure the timeliness and reliability of the data reporting from the MMS to the ARS, more than one type of data transfer may used. To keep the amount of data to a minimum, several data compression techniques will be considered. Each of these will be evaluated for effectiveness in the system. Techniques considered will include:

Fourier signal transform, to transmit frequency spectrum data rather than raw sensed data;

Digital filtering out the frequencies which are not attributable to bridge resonance before transmission;

Lossy compression-transmitting only changed data or performing data averaging;

Lossless compression algorithms-performing data compression algorithms such as LZW or Huffman coding.

It is likely that more than one type of data transfer schemes will be recommended. Location, for example, may prohibit a remote from transferring data via RF links. In this case, the condition and use of the structure may allow an alternative method to be used. Several options will be considered including: manual data collection, cellular technology, and hardware link (telephone or WAN). The telemetry subsystem 18 and ARS 20 may also use a cellular telephone, modems, and a standard office telephone to transfer data to and from the remote site. The cellular phone will be connected to the CDAPS system controller 30 via modem. Figure is a block diagram of communication system, including the telemetry system. ARS commands to the CDAPS initiates data transfer to the ARS, where it is validated and analyzed.

Data received at the ARS is analyzed for spectrum correlation with previous measurements. There will be two basic types of loading conditions, known and random. The known loading condition will consist of actual loading tests, such as those test performed with load trucks by the Alabama DOT, as described hereinbefore. The random loading conditions will consist of "normal" local traffic over a bridge. Whether a bridge is subjected to a random load or a known load, it is proposed that the same basic frequency response of the bridge will occur. Therefore, by performing a baseline load calculation and frequency response calculation, the response of the bridge due to local random traffic can be monitored and compared to the baseline signature of the bridge to determine health.

As described hereinbefore, the LSS indirectly measures the velocity time history of a targeted point on the bridge by calculating the frequency shift in the laser when it is reflected off of the target. The data acquisition system receives, conditions, and digitize the velocity time history signal prior to post-processing the signal or calculating the data signal's power spectral density (PSD).

The PSD of a signal is defined as the cosine Fourier transform of the auto-correlated time history signal and is expressed in the following equation, where $S_x(f)$ is PSD and $Rx(\tau)$ is the autocorrelation function.

$$S_x(f) = \int R_x(\tau) e^{-j2\pi f \tau} d\tau \qquad \text{Equation 8}$$

The autocorrelation function of a signal is defined as the average of the product of the value of the signal at time t and the value of the signal at time t+$\tau$, and is expressed in the following equation. Since the signal measured by the LSS is velocity, it has been used in the following equation for clarity:

$$R_x(\tau) = v(t)v(t+\tau) \qquad \text{Equation 9}$$

$$\equiv \lim_{T_0 \to \infty} as \left\{ 1/T_0 \int_{-T_0/2}^{T_0/2} v(t)v(t+\tau) dt \right\}$$

In Equation 9, $T_0$ is the recorded length of the signal and $\tau$ is the amount of relative shift that occurs between the signal during each step of calculating the autocorrelation of the signal. When the PSD of the time signal is calculated, the resulting signal is a frequency spectrum of the response of the bridge.

Figure 6:
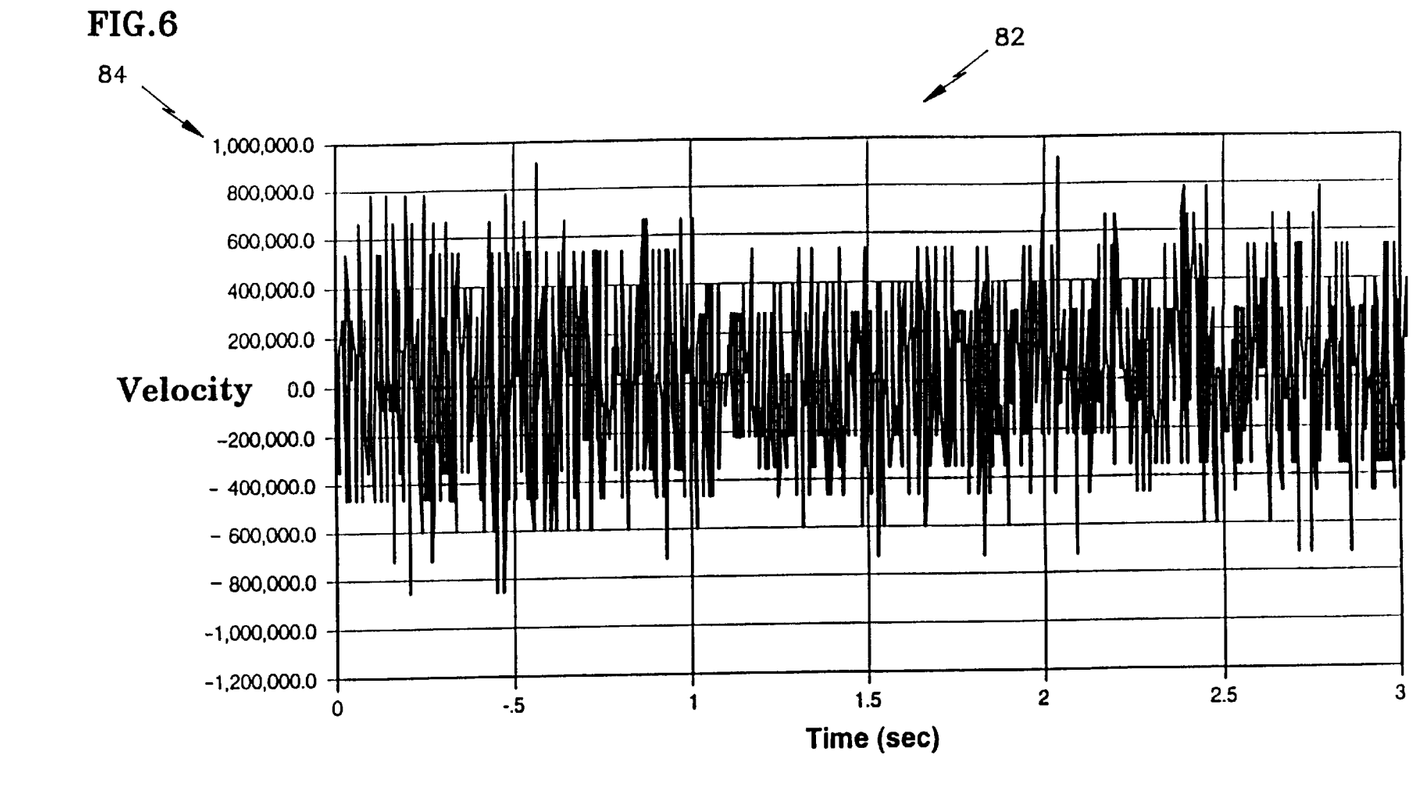
FIG. 6 is a waveform illustration which is used in teaching the operation of the embodiment of FIG. 1.
Figure 7:
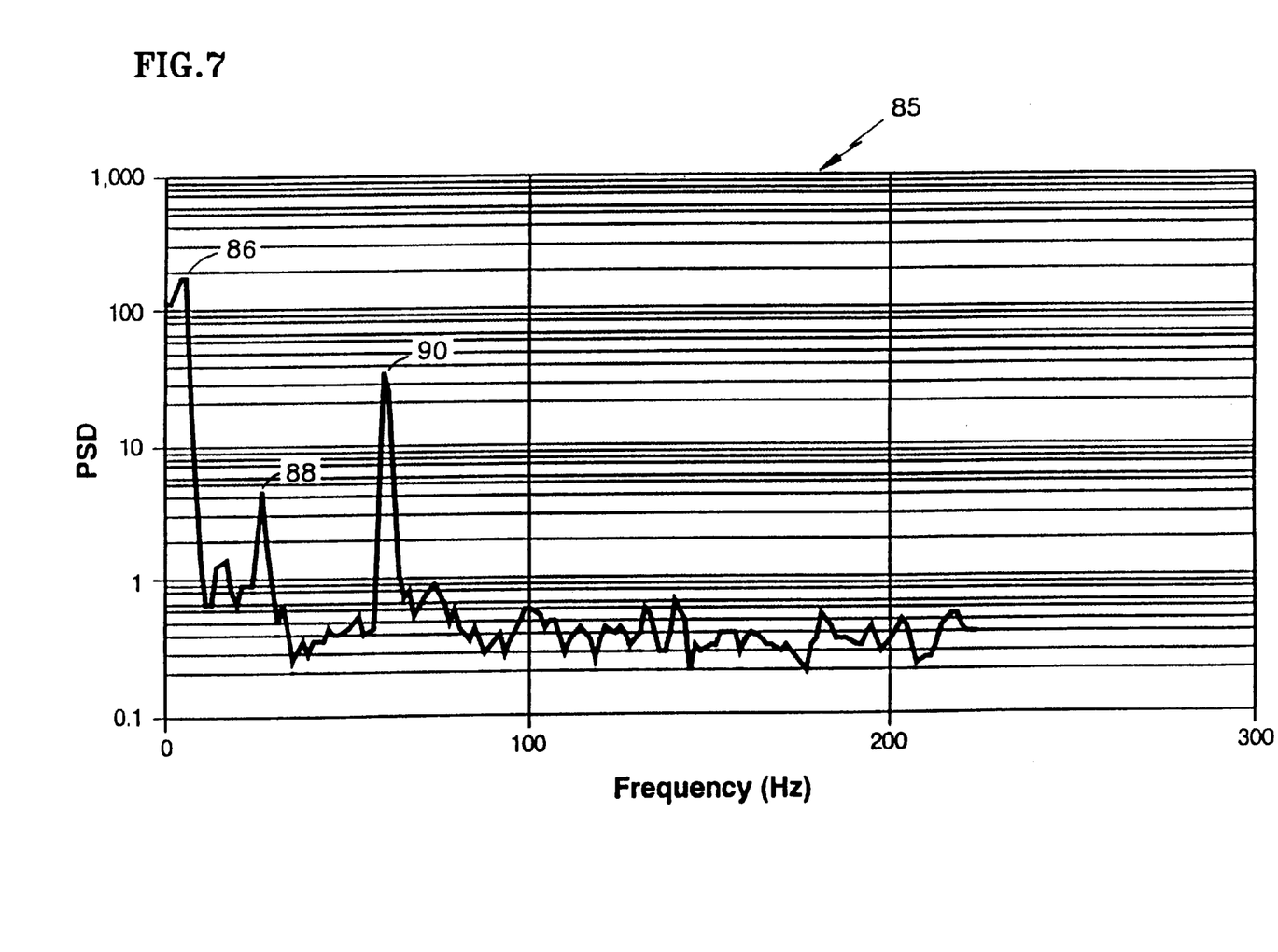
FIG. 7 is another waveform illustration which is used in teaching the operation of the embodiment of FIG. 1.

FIG. 6 is a typical velocity time history data sample 82 showing a four second time lapse. The varying velocity magnitudes are shown along the ordinate axis 84. FIG. 7 is the corresponding PSD 85 of the time history 82 of FIG. 6. The three largest peaks 86, 88, 90 on the PSD plot represent the major fundamental modes of the structure that are contributing to the response of the bridge due to the stimulus of the vehicle crossing. If this were a known loading condition, such as that provided by quantified load tests (e.g. the Alabama DOT testing), the first peak 86 at approximately 5 Hz, the second peak 88 at approximately 25 Hz, and the third peak 90 at approximately 65 Hz would be used to define the baseline signature of the bridge. Also, since the loading condition would be known, and the load carrying capabilities of the bridge would be calculated during the baseline test, this frequency signature could be correlated to the load capacity of the bridge. So the question is, how can the frequency response of the bridge describe the health of that bridge or the load carrying capacity of that bridge?

When the load carrying capacity of a bridge is measured, the theoretical shears and moments of a bridge due to a loading condition are compared to the actual test values of moment and shear. If the frequency response of the bridge is measured at the same time that the load carrying capacity of the bridge is determined, a baseline can be established that correlates the stiffness to the strength of the bridge. Since it is proposed that the frequency response of the bridge is not heavily dependent on the loading condition, the random local traffic that uses the bridge will also cause the bridge to respond similar to the baseline signature. By monitoring the response and comparing it to previous responses and the baseline signature response, a trending database can be established for a bridge.

Trending of the responses will determine if the stiffness of the bridge has changed since the load test. Since stiffness is related to the strength of the bridge and the frequency at which the bridge responds is a measure of that stiffness, the conclusion can be made that the strength of the bridge has not changed if the frequency response of the bridge has not changed. In order to determine the approximate load carrying capacity of a bridge using the frequency response of that bridge, a correlation between the shift in frequency response and the strength of the bridge for the starting frequency response must be determined. This can also be determined by trending the reduction in measured strength to the shift in frequency response.

Figure 8:
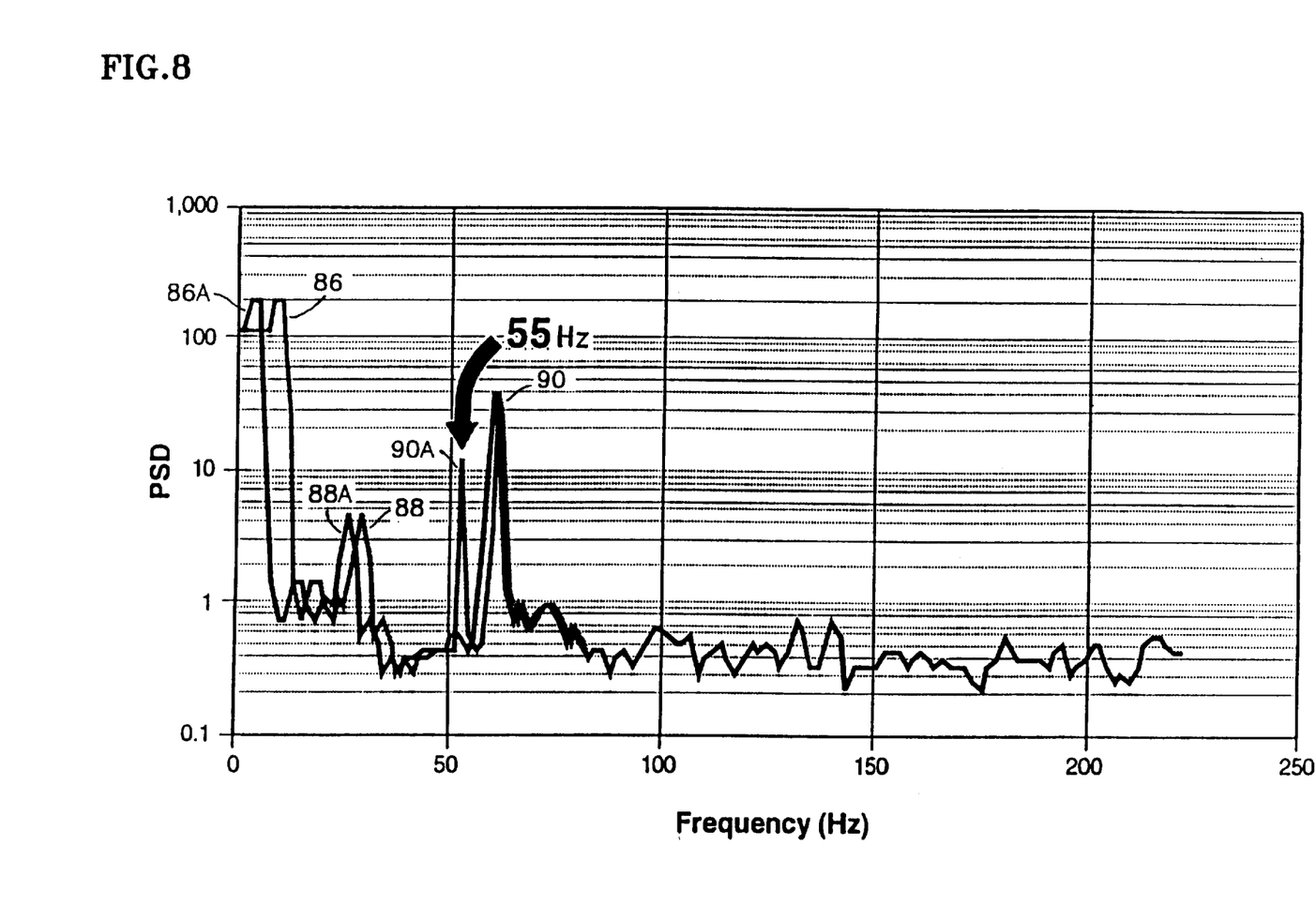
FIG. 8 is still another waveform illustration which is used in teaching the operation of the embodiment of FIG. 1.

FIG. 8 shows a simulated shift (peaks 86A, 88A, and 90A) in the PSD frequency response reported in FIG. 7, as may occur due to a structural problem with the bridge. If this shift had occurred over a period of time or measurements, the cause of the shift would be due to deterioration of the bridge. Based on a gradual shift in response, the inspection schedule of the bridge could be set to inspect once the signature of the bridge shifted by a set amount. If the shift in the response had occurred between two consecutive measurements, the step change in the response would indicate a potential structural problem. When a step change occurs, more measurements and analysis would be done to ensure the reliability of the signature and an inspection of the structure may be warranted. The frequency response signal will also be monitored for occurrences of "new" frequencies that were not previously recorded. In FIG. 8, the frequency response at approximately 55 hertz, which did not exist on 10 previous measurements, would also indicate a change in the bridge's stiffness.

The reporting part of this subsystem is the notification mechanism for engineering and management to assess and determine courses of action. Reporting is done through a variety of methods including:

Electronic transfer, modem and E-mail;

Hardcopy;

Facsimile;

Verbal description by phone

Formats for data and information vary depending upon the method of transfer and specific information being reported. Prompt notification is required to ensure communication of the specific information to key personnel in the engineering, quality and management disciplines. Decisions to retest, evaluate and verify test equipment, inspect hardware, replace hardware, delay further processing of hardware, disassemble part of the component or structure, and assess other designs of similar configuration and/or build dates are crucial elements for safe and reliable hardware operation and use. These types of reporting methods and notification techniques will form the basis for investigating how to best integrate bridge monitoring data into the global bridge management system.

It is also necessary to evaluate the impact of the new laser-derived data on a comprehensive bridge management system. Interface requirements for organizations, databases, and other communication mechanisms will be evaluated to determine the effects of having the new information. Inspection/maintenance policy and procedures that could be affected by this data will also be analyzed for potential changes and enhancements. The overall goal of the assessments will be to understand how engineering, management and economic factors are affected by the new data system and how decision-making ability is enhanced.

Changes in the condition of a bridge indicated by a change in the bridge's response characteristics will be reported to the overall bridge management system. The type of report generated is dependent upon the analysis of the condition of the bridge. A small or gradual change in the bridge's response would be reported on a regularly scheduled basis. Any large, sudden, or nonconformal change will initiate an anomaly report, for immediate input and response by the bridge management system. Data and information contained in the reports may be used differently by different bridge management systems, depending on the architecture and capabilities of the bridge management system.

An anomaly report will be the result of data and analyses that show a potential problem based on a frequency shift or other data which supports immediate attention. Having near real-time data is a new capability not currently entered or visible within most, if not all, bridge management databases. Assessment will be made of how the ARS 20 data will be input into management systems/databases and how responsible engineering and management personnel within the DOTs are notified and can best benefit from it. This includes determining the requirements and constraints placed upon the present Bridge Monitoring System in order to allow transfer of acquired bridge data to existing and developmental bridge management systems operated at the State and Federal levels.

Unscheduled inspection is a direct result of an Anomaly Report and will dictate rapid response to determine whether a critical condition is present. It is expected that as the database matures, more diagnostic capabilities will be established to assess the magnitude of bridge deterioration. This will allow engineers and managers to make better decisions about how rapidly inspection is needed and if load limiting may be required prior to inspection. Again, these factors will be evaluated as part of the interface assessment.

Figure 9:
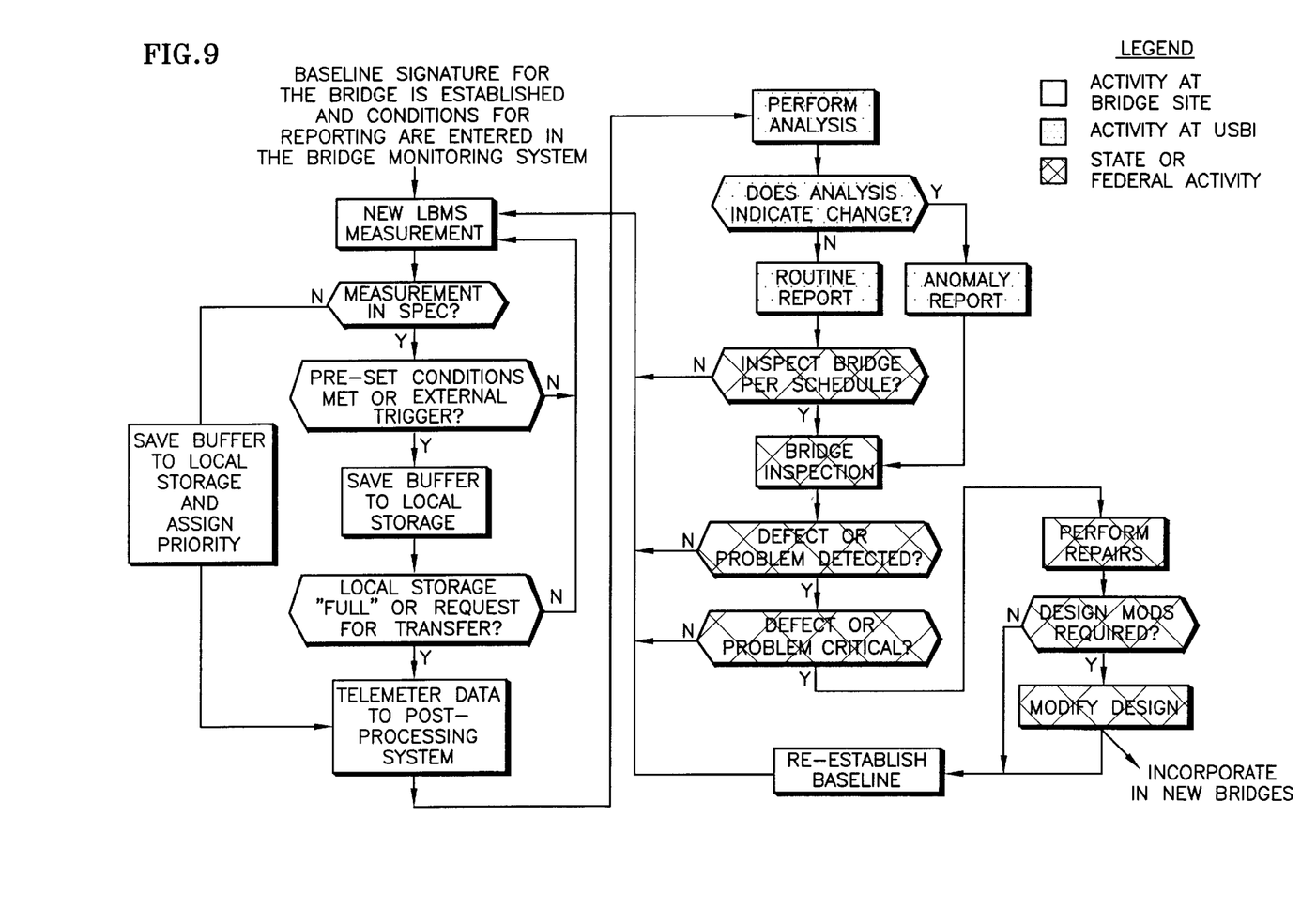
FIG. 9 is a flow chart diagram also used in teaching the operation of the embodiment of FIG. 1.

If a major defect is detected during inspection, then significant assessment will be required and should be consistent with established procedures already in place through state Departments of Transportation. The assessment results could involve repairs to the bridge, and possible design modes which afford longer-term implementation. Part of the interface assessment will involve determining how a continuous monitoring and analysis system will integrate with the defect assessment process and the decision-making process for repair and potential design modification. FIG. 9 shows a top-level logic chart for the BMS illustrating the organizations involved and some of the decision paths for various functions.

It is also foreseen that for the eventual continuously monitored condition of many bridges, engineering and management data could be directly input into a system such as the Structure Inventory and Appraisal of the Nation's Bridges, as defined by the FHWA Report No. FHWA-ED-89-044, entitled "The Recording and Coding Guide for the Structure Inventory and Appraisal of the Nation's Bridles" (hereinafter "Structural Database"). Data reported would likely impact the sufficiency rating calculated for the bridge and the resulting status of the bridge. Structural Database items 59 ("superstructure condition rating") and 67 ("structural evaluation"), would directly benefit from BMS reports. As a part of a comprehensive bridge management system, the BMS reports would also assist in determining Structural Database items 90 through 93, which dictate the inspection status of the bridge. Structural Database items 114 and 115, which deal with the prediction of future average daily traffic anticipated for the bridge, would benefit from BMS reports as well. There may be other aspects of a future or developing bridge management system that could take even more advantage of the bridge condition data from the BMS.

Tests will be performed to verify the complete transfer of data between the ARS 20 bridge measurement/monitoring and analysis system and identified State and Federal bridge management systems. Use of the proposed telemetry subsystem, as well as other means of data transfer, will be considered for this task.

Although the invention has been shown and described with respect to a best mode embodiment thereof, it should be understood by those skilled in the art that various changes, omissions, and additions may be made to the form and detail of the disclosed embodiment without departing from the spirit and scope of the invention as recited in the following claims.

We claim:

1. Apparatus for monitoring a vibratory state of structural members of a bridge in response to quiescent bridge conditions, comprising a laser light source producing a single laser light beam;

a 1:N splitter forming a plurality of individual laser light beams from said single laser light beam, wherein each individual laser light beam in said plurality thereof is directed to illuminate a target area within a plurality of target areas on the surface of each of one or more individual bridge structural elements for a period of time;

detector means, for receiving a reflection of said individual laser light beam from each said target area to provide individual velocity time signals indicative of surface deflections of said individual target areas in said period of time; and signal processing means, connected for response to said detector means for converting each said velocity time signal into a corresponding frequency domain signal, to identify quiescent frequency response characteristics of an associated structural element.

2. The apparatus of claim 1, wherein said signal processing means multiplexes said individual velocity time signals from each said target area to provide a composite velocity time signal indicative of the overall response of the bridge to the surface deflections of the aggregate of said individual target areas in said period of time.

3. The apparatus of claim 1, wherein said signal processing means multiplexes said individual velocity time signals from each said target area to provide a composite velocity time signal indicative of the overall response of the bridge to the surface deflections of the aggregate of said individual target areas in said period of time; and wherein said signal processing means converts said composite velocity time signal into a corresponding composite frequency domain signal to provide a signature indicative of the overall frequency response of the bridge to the surface deflections of the aggregate of said individual target areas in said period of time.

4. The apparatus of claim 1, wherein said laser light source includes:

an Er-doped solid state continuous wave laser, and an Er-doped fiber amplifier, wherein a laser output beam is directed to said fiber amplifier from said continuous-wave laser, and wherein said single laser light beam is directed to said splitter from said fiber amplifier.

5. The apparatus of claim 4, wherein said continuous wave laser generates said laser output beam having a single frequency of approximately 1.55 $\mu$m.

6. The apparatus of claim 4, wherein said continuous wave laser generates said laser output beam at a power of approximately 15 mW.

7. The apparatus of claim 1, wherein each individual laser light beam in said plurality thereof is directed into an individual laser sensor including:

said detector means a first individual beam splitter directing an output signal portion of said individual laser light beam toward a target area in said plurality of target areas and a reference signal portion of said individual laser light beam toward said detector means.

8. The apparatus of claim 7, wherein said individual laser sensor additionally includes an optical circulator, said output signal portion is directed toward said target area through said optical circulator, said individual laser sensor is aligned with said target area so that a reflection of said output signal portion is returned from said target area to said optical circulator, said optical circulator directs said reflection of said output signal portion toward said detector means, and said reference signal portion and said reflection of said output signal portion are combined in said detector means.

9. The apparatus of claim 8, wherein said first individual beam splitter is a first fiber-optic splitter;

said detector means includes a second fiber-optic splitter; and said reference signal portion and said reflection of said output signal are combined in said second fiber-optic splitter.

10. The apparatus of claim 8, wherein an output of said detector means includes a signal representing a difference in frequency between said reference beam portion and said reflection of said output signal portion.

11. The apparatus of claim 10, wherein said detector means additionally includes a fringe counter measuring a number of wavelengths of said individual laser beam through which said target area moves.

12. The apparatus of claim 11, wherein said detector means additionally includes a digital to analog convertor, and an output of said fringe counter is passed through said digital to analog convertor to generate an analog signal representing displacement of said target area.

13. Apparatus for monitoring movement of a target area on a structural member of a bridge, in response to quiescent conditions, comprising:

means for generating a laser light beam; and an individual light sensor including a detector, a first beam splitter directing an output signal portion of said laser light beam toward said target area and a reference signal portion of said laser light beam toward said detector, and an optical circulator, wherein said output signal portion is directed toward said target area through said optical circulator, said individual laser sensor is aligned with said target area so that a reflection of said output signal portion is returned from said target area to said optical circulator, said optical circulator directs said reflection of said output signal portion toward said detector, and said reference signal portion and said reflection of said output signal portion are combined in said detector.

14. The apparatus of claim 13, wherein said first individual beam splitter is a first fiber-optic splitter;

said detector includes a second fiber-optic splitter; and said reference signal portion and said reflection of said output signal are combined in said second fiber-optic splitter.

15. The apparatus of claim 13, wherein an output of said detector includes a signal representing a difference in frequency between said reference signal portion and said reflection of said output signal portion.

16. The apparatus of claim 15, wherein said detector additionally includes a fringe counter measuring a number of wavelengths of said output signal portion of said laser light beam through which said target area moves.

17. The apparatus of claim 16, wherein said detector additionally includes a digital to analog convertor, and an output of said fringe counter is passed through said digital to analog convertor to generate an analog signal representing displacement of said target area.

18. Apparatus for monitoring a vibratory state of structural members of a bridge in response to quiescent bridge conditions, comprising:

a plurality of reflective targets in a plurality of positions on said structural members;

laser means generating a plurality of individual laser light beams;

a plurality of sensors arranged so that each individual laser light beam enters a sensor within said plurality of sensors, wherein an output portion of each individual laser light beam is directed from said sensor to a target within said plurality of reflective targets, wherein a reflection of said output portion returns to said sensor, and wherein said sensor includes a detector forming a motion detection signal in response to movement of said target;

a local data processing system receiving said motion detection signal from each sensor within said plurality of sensors;

a remote data processing system wherein said remote data processing system includes storage holding data from previous measurements of said vibratory state of structural members of said bridge, and wherein data received from current measurements of said vibratory state of structural members of said bridge is compared to said data from previous measurements of said vibratory state of structural members of said bridge; and a transmission link between said local data processing system and said remote data processing system for transmitting data and instructions, wherein said local data processing system calculates data indicating said vibratory state of structural members of said bridge and transmits said data over said transmission link to said remote data processing system.

19. The apparatus of claim 18, wherein said laser means includes:

a laser light source producing a single laser light beam; and a 1:N splitter forming said plurality of individual laser light beams from said single laser light beam.

20. The apparatus of claim 19, wherein said laser light source includes:

an Er-doped solid state continuous wave laser, and an Er-doped fiber amplifier, wherein a laser output beam is directed to said fiber amplifier from said continuous-wave laser, and wherein said single laser light beam is directed to said splitter from said fiber amplifier.

21. The apparatus of claim 18, wherein each sensor within said plurality of sensors includes a first individual beam splitter directing an output signal portion of said individual laser light beam toward a target within said plurality reflective targets and a reference signal portion of said individual laser light beam toward said detector.

22. The apparatus of claim 21, wherein each sensor within said plurality of sensors additionally includes an optical circulator, said output signal portion is directed toward said target through said optical circulator, said individual laser sensor is aligned with said target area so that a reflection of said output signal portion is returned from said target area to said optical circulator, said optical circulator directs said reflection of said output signal portion toward said detector, and said reference signal portion and said reflection of said output signal portion are combined in said detector.

23. The apparatus of claim 18, wherein an output of said detector includes a signal representing a difference in frequency between said reference beam portion and said reflection of said output signal portion.

24. The apparatus of claim 23, wherein said detector additionally includes a fringe counter measuring a number of wavelengths of said individual laser beam through which said target area moves.

25. The apparatus of claim 18, wherein said remote data processing system calculates and stores a cosine Fourier transform of an auto-correlated time history signal of movement of said structural members of said bridge; and said cosine Fourier transform of current measurements of movement of said structural members of said bridge is compared to a cosine Fourier transform calculated from previous measurements of movement of said structural members of said bridge.

26. The apparatus of claim 25, wherein said auto-correlated time history signal is an average of the product of the value of the signal of movement of said structural members of said bridge at a particular time, multiplied by the product of the value of the signal of movement of said structural members of said bridge at an incremental time after said particular time.

* * * * *